United States Patent
Le

(10) Patent No.: US 11,640,330 B2
(45) Date of Patent: May 2, 2023

(54) FAILURE ESTIMATION SUPPORT APPARATUS, FAILURE ESTIMATION SUPPORT METHOD AND FAILURE ESTIMATION SUPPORT PROGRAM

(71) Applicant: Nippon Telegraph and Telephone Corporation, Tokyo (JP)

(72) Inventor: Vuhung Le, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 22 days.

(21) Appl. No.: 17/607,137

(22) PCT Filed: May 28, 2019

(86) PCT No.: PCT/JP2019/021023
§ 371 (c)(1),
(2) Date: Oct. 28, 2021

(87) PCT Pub. No.: WO2020/240680
PCT Pub. Date: Dec. 3, 2020

(65) Prior Publication Data
US 2022/0214936 A1    Jul. 7, 2022

(51) Int. Cl.
*G06F 11/07*     (2006.01)
*G06N 5/02*     (2023.01)
*G06N 5/025*     (2023.01)

(52) U.S. Cl.
CPC ........ *G06F 11/079* (2013.01); *G06F 11/0709* (2013.01); *G06N 5/025* (2013.01)

(58) Field of Classification Search
CPC .... G06F 11/079; G06F 11/0709; G06N 5/025
See application file for complete search history.

(56) References Cited

U.S. PATENT DOCUMENTS

| | | | |
|---|---|---|---|
| 2011/0126045 A1* | 5/2011 | Bennett | G11B 20/1833 |
| | | | 714/6.22 |
| 2015/0089294 A1* | 3/2015 | Bell | G06F 11/0706 |
| | | | 714/37 |
| 2020/0159601 A1* | 5/2020 | Asmussen | G06K 9/6256 |

OTHER PUBLICATIONS

Itoi et al., "Automatic failure location estimation technologyaimed at increasing knowledge and speeding upfailure response operations," NTT Technology Journal, 2017, retrieved from URL<http://www.ntt.co.jp/journal/1705/files/jn20170560.pdf>, 29(5):60-64, 11 pages (with English translation).

* cited by examiner

*Primary Examiner* — Jigar P Patel
(74) *Attorney, Agent, or Firm* — Fish & Richardson P.C.

(57) ABSTRACT

A failure estimation support device 2 includes: a first calculation unit 21 configured to calculate single failure occurrence probabilities of individual single rules for each single rule relating to a single failure from past failure occurrence data; a second calculation unit 22 configured to calculate multiple failure occurrence probabilities that multiple failures occur in association for each combination of multiple single rules using the single failure occurrence probabilities; and a correlation rule generation unit 23 configured to select the combination of the multiple failure occurrence probabilities greater than a predetermined threshold among the multiple failure occurrence probabilities as a correlation rule, and the correlation rule is used as training data for making a learned model which estimates a failure factor perform machine learning together with the single rule.

9 Claims, 4 Drawing Sheets

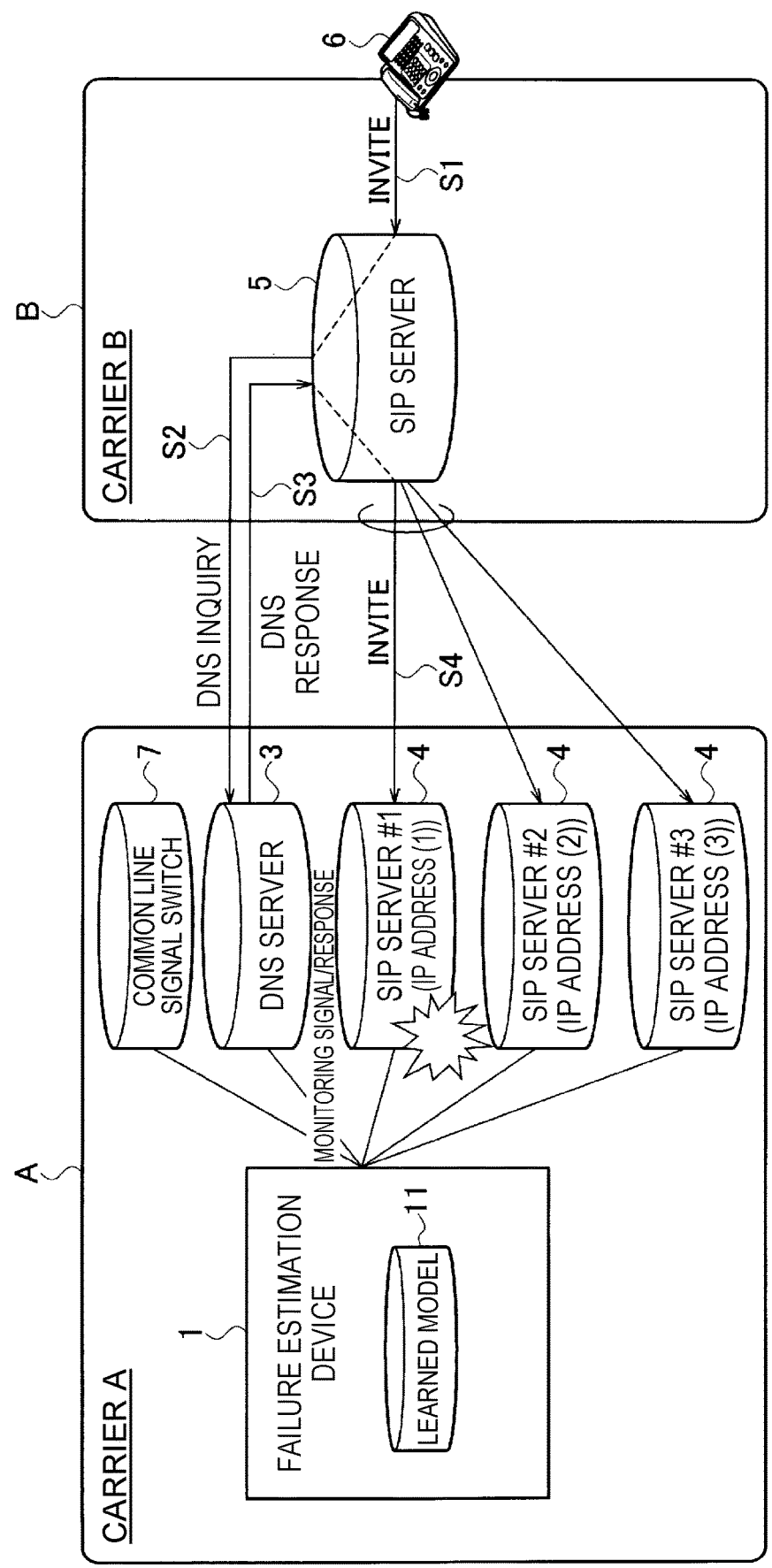

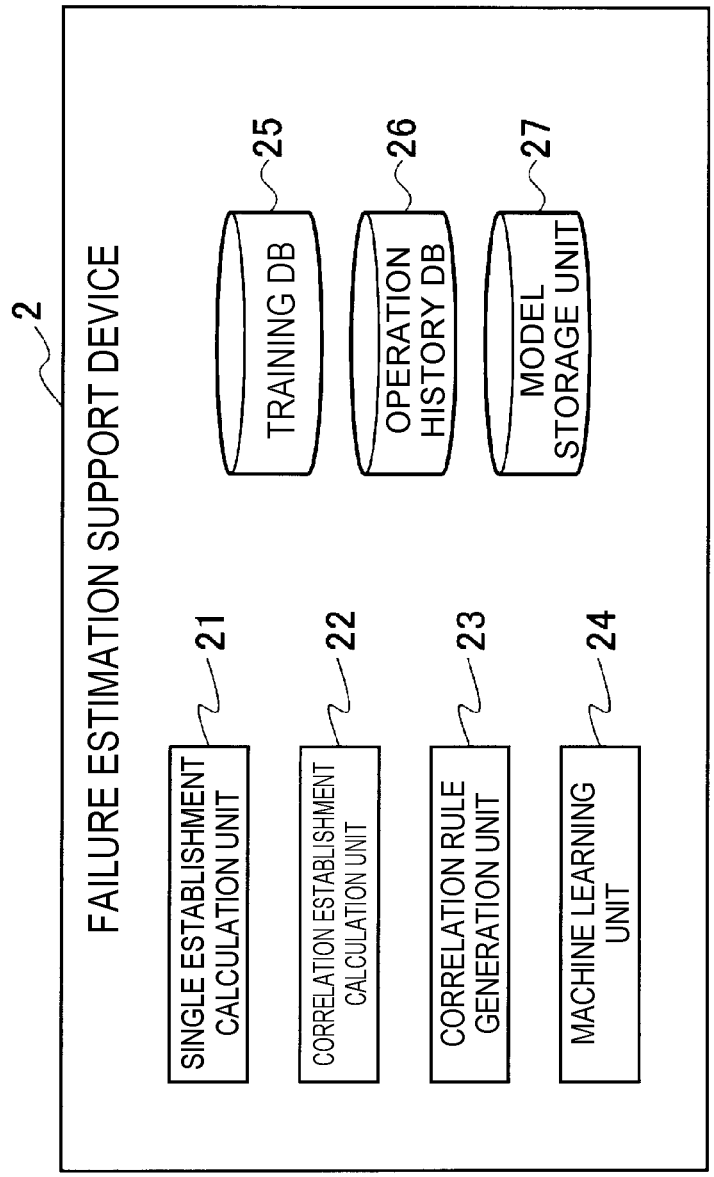

Fig. 3

CLASSIFICATION A
(RULES RELATING TO RESPONSE)

| CLASSIFICATION | TYPE | CONTENT | DESCRIPTION | RULE |
|---|---|---|---|---|
| A1 | 1xx | PROVISIONAL RESPONSE | REPORTING REQUEST IS RECEIVED AND IS BEING PROCESSED 100Trying/180Ringing/··· | Yes/No |
| A2 | 2xx | SUCCESS | REPORTING REQUEST IS SUCCESS 200 OK | Yes/No |
| A3 | 3xx | REDIRECT RESPONSE | REQUEST NEEDS TO BE SENT TO DIFFERENT LOCATION 301 Moved Permanently/302 Moved Temporary/··· | Yes/No |
| A4 | 4xx | REQUEST ERROR RESPONSE | PROCESSING CANNOT BE PERFORMED BECAUSE OF REQUEST ERROR 400 Bad Request/404 Not Found/486 Busy/··· | Yes/No |
| A5 | 5xx | SERVER ERROR RESPONSE | PROCESSING CANNOT BE PERFORMED BECAUSE OF ERROR OCCURRENCE IN SERVER 500 Server Internal Error /··· | Yes/No |
| A6 | 6xx | GLOBAL ERROR RESPONSE | REQUEST CANNOT BE EXECUTED IN ANY SERVER 600 Busy Everywhere / 603 | Yes/No |
| ··· | | | | |

CLASSIFICATION B
(RULES RELATING TO HEADER)

| CLASSIFICATION | HEADER | DESCRIPTION | RULE |
|---|---|---|---|
| B1 | Call-ID | | |
| B2 | Contact | | |
| B3 | CSeq | | |
| B4 | From | REQUEST ERROR RESPONSE | Yes/No |
| B5 | Via | GLOBAL ERROR RESPONSE | Yes/No |
| B6 | To | SERVER ERROR RESPONSE | Yes/No |
| B7 | Content-Type | INDICATING MEDIUM TYPE OF BODY PART | application/sdp? (EXAMPLE) |
| B8 | Content-Length | SIZE OF BODY PART | ≧152? (EXAMPLE) |
| B9 | Max-Forwards | LIMITING PROXY, GATEWAY THAT REQUEST CAN BE FORWARDED     VALUE IS DECREMENTED EVERY TIME OF FORWARDING | ≧70? (EXAMPLE) |
| ··· | | | ··· |

CLASSIFICATION C
(UNCLASSIFIED RULES)

| CLASSIFICATION | CONTENT | |
|---|---|---|
| C1 | WHETHER VoIP IS FUNCTIONING | Yes/No |
| C2 | WHETHER VOICE CALL IS EXECUTABLE | Yes/No |
| C3 | WHETHER CODEC SUPPORTED BY SIP IS USED | Yes/No |
| ··· | | ··· |

US 11,640,330 B2

FAILURE ESTIMATION SUPPORT APPARATUS, FAILURE ESTIMATION SUPPORT METHOD AND FAILURE ESTIMATION SUPPORT PROGRAM

CROSS-REFERENCE TO RELATED APPLICATIONS

This application is a National Stage application under 35 U.S.C. § 371 of International Application No. PCT/JP2019/021023, having an International Filing Date of May 28, 2019. The disclosure of the prior application is considered part of the disclosure of this application, and is incorporated in its entirety into this application.

TECHNICAL FIELD

The present invention relates to a failure estimation support device, a failure estimation support method, and a failure estimation support program that support estimation of a failure cause when a failure occurs.

BACKGROUND ART

In recent years, interconnectivity confirmation tests have been executed for IP interconnection between individual common carriers (carriers). At the time of the IP interconnection between the carriers using SIP, when abnormality/error of an SIP server occurs, an error message is reported to a maintenance person, and the maintenance person estimates a failure cause by analyzing an alarm from a detected alarm and network configuration information.

Non-Patent Literature 1 describes an automatic failure point estimation technology which presents candidates of a failure cause point when a failure occurs.

CITATION LIST

Non-Patent Literature

Non-Patent Literature 1: Kenji Itoi, Taisuke Yakawa, Haruo Oishi, and Katsuhiko Okazaki, "Automatic Failure Points Estimation Technology for Generating Knowledge and Rapid Recovering Operations", NTT Technical Journal, Vol. 29, No. 5 Internet <URL: http://www.ntt.co.jp/journal/1705/files/jn20170560.pdf>

SUMMARY OF THE INVENTION

Technical Problem

Since there are a wide variety of failures of an SIP server, it is difficult to pursue failure causes. In addition, because of IP interconnection between individual common carriers, when abnormality or an error of the SIP server occurs, failure isolation, failure analysis and cause countermeasures or the like become complicated more than a present situation so that it is assumed that operation loads on a maintenance person increase further.

The present invention is implemented in consideration of the situation described above, and an object of the present invention is to provide a technology that supports estimation of a failure cause when a failure occurs.

Means for Solving the Problem

In order to achieve the object described above, one aspect of the present invention is a failure estimation support device including: a first calculation unit configured to calculate single failure occurrence probabilities of individual single rules for each single rule relating to a single failure from past failure occurrence data; a second calculation unit configured to calculate multiple failure occurrence probabilities that multiple failures occur in association for each combination of multiple single rules using the single failure occurrence probabilities; and a correlation rule generation unit configured to select the combination of the multiple failure occurrence probabilities greater than a predetermined threshold among the multiple failure occurrence probabilities as a correlation rule, and the correlation rule is used as training data for making a learned model which estimates a failure factor perform machine learning together with the single rule.

One aspect of the present invention is a failure estimation support method performed by a failure estimation support device including: a first calculation step of calculating single failure occurrence probabilities of individual single rules for each single rule relating to a single failure from past failure occurrence data; a second calculation step of calculating multiple failure occurrence probabilities that multiple failures occur in association for each combination of multiple single rules using the single failure occurrence probabilities; and a correlation rule generation step of selecting the combination of the multiple failure occurrence probabilities greater than a predetermined threshold among the multiple failure occurrence probabilities as a correlation rule, and the correlation rule is used as training data for making a learned model which estimates a failure factor perform machine learning together with the single rule.

One aspect of the present invention is a failure estimation support program in which a computer is made to function as the failure estimation support device.

Effects of the Invention

According to the present invention, a technology of supporting estimation of a failure cause when a failure occurs can be provided.

BRIEF DESCRIPTION OF DRAWINGS

FIG. 1 is a diagram illustrating an entire configuration of a communication system relating to an embodiment of the present invention.
FIG. 2 is a functional block diagram illustrating a configuration of a failure estimation support device.
FIG. 3 is a diagram illustrating examples of single rules.

DESCRIPTION OF EMBODIMENTS

Figure 4:
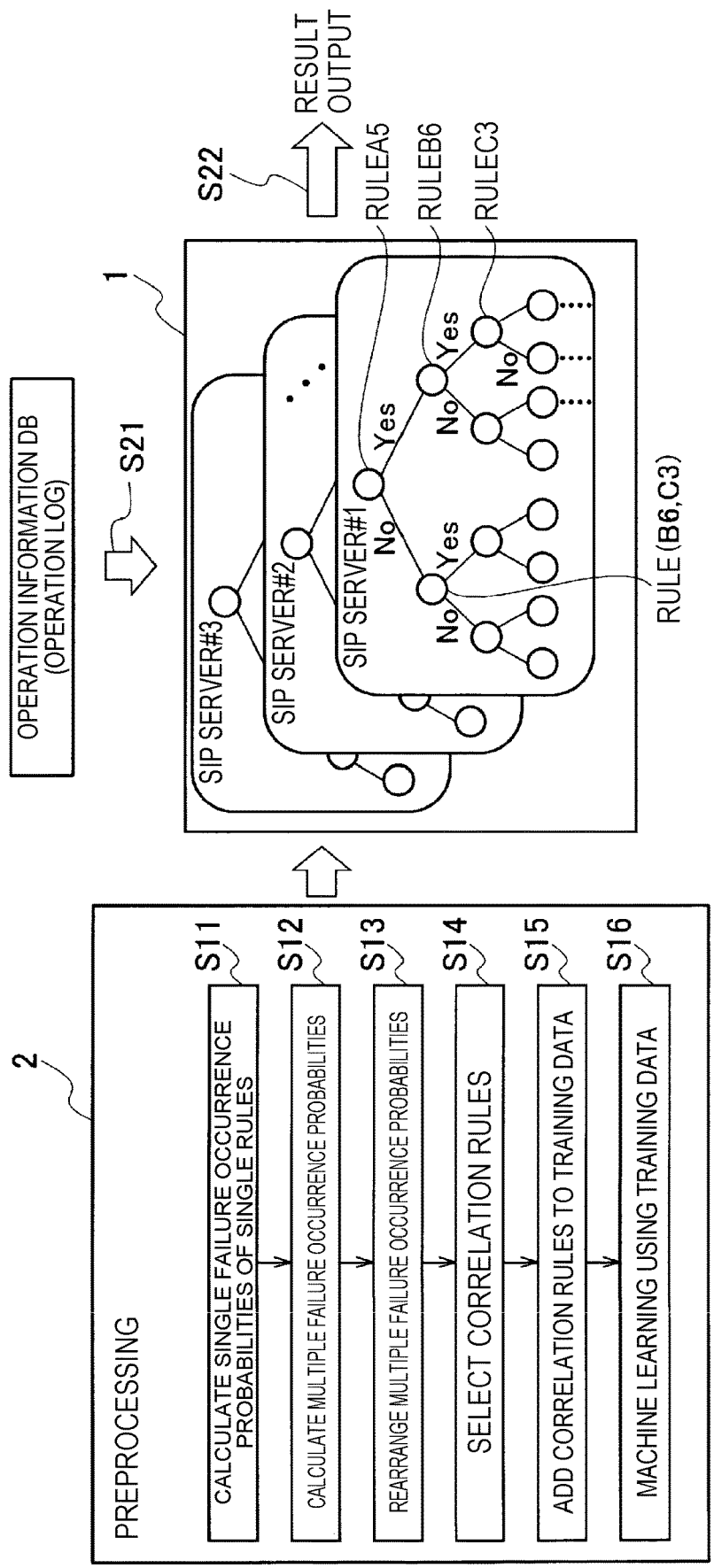
FIG. 4 is an explanatory drawing illustrating processing of the failure estimation support device.

Hereinafter, the embodiment of the present invention will be described with reference to the drawings.

FIG. 1 is an example of a communication system in which IP interconnection is performed between different common carriers. The illustrated communication system is the communication system in which a communication network A of a carrier A and a communication network B of a carrier B are IP-interconnected.

The illustrated communication network A includes a failure estimation device 1, a common line signal switch 7, a DNS (Domain Name System) server 3, and a plurality of SIP servers 4. The failure estimation device 1 monitors the common line signal switch 7, the DNS server 3 and the SIP servers 4, detects a failure, and estimates a failure cause. The failure estimation device 1 of the present embodiment includes a learned model 11 for estimating the failure cause, and estimates the failure cause using the learned model 11.

The common line signal switch 7 separates a channel network and a signal network of a telephone network, and processes signals by using a dedicated line. The DNS server 3 is a name resolution server which outputs a corresponding IP address from a domain name (name). The SIP servers 4 are servers that control an IP telephone service utilizing a SIP (Session Initiation Protocol). The illustrated communication network B includes a SIP server 5 and a SIP terminal 6.

In the illustrated example, an INVITE message is transmitted to the SIP server 5 by call origination from the SIP terminal 6 of the communication network B (S1). The SIP server 5 inquires of the DNS server 3 a transmission destination of an INVITE signal (S2), and receives a response from the DNS server 3 (S3). Then, the SIP server 5 transmits the INVITE message to the SIP server 4 of the communication network A corresponding to the response (S4).

Here, in a case where a failure occurs in the SIP server (#1) 4 of the communication network A, the INVITE message transmitted from the SIP server 5 of the communication network B becomes an error, and an error message is outputted to the failure estimation device 1. The failure estimation device 1 estimates the failure cause by inputting various kinds of messages outputted from the individual devices 2-4 to be monitored to the learned model 11.

FIG. 2 is a functional block diagram illustrating a configuration of a failure estimation support device 2 relating to the present embodiment. The failure estimation support device 2 generates training data (teacher data) for making the learned model provided in the failure estimation device 1 illustrated in FIG. 1 perform machine learning.

The illustrated failure estimation support device 2 includes a single probability calculation unit (first calculation unit), a correlation probability calculation unit 22 (second calculation unit), a correlation rule generation unit 23, a machine learning unit 24, a training DB (database) 25, an operation history DB 26, and a model storage unit 27.

The single probability calculation unit 21 calculates single failure occurrence probabilities of individual single rules for each single rule relating to a single failure from past failure occurrence data stored in the operation history DB 26. The single rule is a rule (cause) relating to the single failure, and is stored in the training DB 25 beforehand.

FIG. 3 illustrates examples of the single rules. The illustrated single rules are classified into three of a classification A, a classification B and a classification C. The classification A is for the single rules relating to the response of the SIP. The classification B is for the single rules relating to a header of the SIP. The classification B is for unclassified rules other than the classification A and the classification B.

The correlation probability calculation unit 22 calculates multiple failure occurrence probabilities that multiple failures occur in association for each combination of multiple single rules using the single failure occurrence probabilities. Specifically, the correlation probability calculation unit 22 may calculate a simultaneous failure occurrence probability that failures of the single rules of the combination simultaneously occur, as the multiple failure occurrence probability. The correlation probability calculation unit 22 may also calculate a conditional probability that a second single rule of the combination occurs in a case where the failure of a first single rule of the combination occurs, as the multiple failure occurrence probability.

The correlation rule generation unit 23 selects the combination of the multiple failure occurrence probabilities greater than a predetermined threshold among the multiple failure occurrence probabilities as a correlation rule. The correlation rule is used as training data (supervised learning data) for making the learned model which estimates a failure factor perform machine learning together with the single rule.

The machine learning unit 24 performs the machine learning using the training data stored in the training DB 25, and generates the learned model (a decision tree or a neural network, for example) for estimating the failure factor.

In the training DB 25, the training data for generating the learned model such as the single rule, the correlation rule generated by the correlation rule generation unit 23 and network configuration information is stored. In the operation history DB 26, a past failure occurrence log and a failure history or the like are stored. In the model storage unit 27, the learned model generated by the machine learning unit 24 is stored.

For the failure estimation support device 2 described above, a general purpose computer system including a CPU (Central Processing Unit, processor), a memory, a storage (HDD: Hard Disk Drive, SSD: Solid State Drive), a communication device, an input device and an output device can be used, for example. In the computer system, the CPU executes a program for the failure estimation support device 22 loaded onto the memory and thus respective functions of the failure estimation support device 2 are realized. In addition, the program for the failure estimation support device 2 can be stored in a computer-readable recording medium such as the HDD, the SSD, a USB memory, a CD-ROM, a DVD-ROM, an MO or the like, or distributed through a network.

FIG. 3 is an explanatory drawing for describing processing of the present embodiment.

The failure estimation support device 2 performs processing in steps S11-S16 as preprocessing. Here, the case where the numbers of failure cases of the single rules indicated below are detected in an operation period of 48 months will be described as an example.

A5 rule (processing cannot be performed because of server error): 9 cases
B6 rule (server error response): 7 cases
C3 rule (codec not supported by SIP is used): 5 cases
B6, C3 simultaneous: 4 cases
A5, B6 simultaneous: 3 cases
A5, C3 simultaneous: 2 cases
A5, B6, C3 simultaneous: 1 case Step S11: The single probability calculation unit 21 of the failure estimation support device 2 calculates the single failure occurrence probabilities of the individual single rules. The single failure occurrence probability is the probability (cases/month) that the failure of the single rule occurs in one month. The single probability calculation unit 21 refers to the operation history DB 26, and acquires the numbers of the failures corresponding to the individual single rules. Here, the single failure occurrence probabilities of A5, B6 and C3 for which the above-described numbers of failures are detected in 48 months are as follows, respectively.

$P(A5)=9/48=0.1875$ $P(B6)=7/48=0.1458$ $P(C3)=5/48=0.1042$

Step 12: The correlation probability calculation unit 22 of the failure estimation support device 2 calculates the multiple failure occurrence probabilities that multiple failures occur in association for each combination of the multiple single rules using the single failure occurrence probabilities. In the present embodiment, the correlation probability calculation unit 22 calculates the simultaneous failure occurrence probability that failures of the combined single rules simultaneously occur, and the conditional probability, as the multiple failure occurrence probability. The conditional probability is the probability that the second single rule of the combination occurs in the case where the failure of the first single rule of the combination occurs. The simultaneous occurrence probabilities and the conditional occurrence probabilities in this case are as follows.

<Simultaneous Occurrence Probabilities>

$P(B6,C3)=4/48=0.0833$ $P(A5,B6)=3/48=0.0625$ $P(A5,C3)=2/48=0.0417$ $P(A5,B6,C3)=1/48=0.0208$

<Conditional Probabilities>

$P(A5|B6)=P(A5,B6)/P(B6)=0.4286$ $P(A5|C3)=P(A5,C3)/P(C3)=0.4000$ $P(B6|C3)=P(B6,C3)/P(C3)=0.8000$ $P(B6|A5)=P(A5,B6)/P(A5)=0.3333$ $P(C3|B6)=P(B6,C3)/P(B6)=0.5714$ $P(C3|A5)=P(A5,C3)/P(A5)=0.2222$

Step 13: The correlation rule generation unit 23 of the failure estimation support device 2 rearranges the multiple failure occurrence probabilities (simultaneous occurrence probabilities, conditional probabilities) in a descending order of the probabilities.

Step 14: The correlation rule generation unit 23 selects the combination of the multiple failure occurrence probabilities greater than a predetermined threshold α among the multiple failure occurrence probabilities rearranged in the descending order of the probabilities as the correlation rule. In the case where the threshold α is "0.5", the correlation rule generation unit 23 selects P(B6|C3)=0.8000 and P(C3|B6)=0.5714 as the correlation rules.

The threshold α is not limited to 0.5. Without using the threshold α, the correlation rule generation unit 23 may select the combinations of the multiple failure occurrence probabilities that are in higher n % (10%, for example) of the calculated multiple failure occurrence probabilities as the correlation rules.

Step 15: The correlation rule generation unit 23 registers the new correlation rules selected in step S14 in the training database. Thus, in the training database, the original single rules and the correlation rules are included.

Step 16: The machine learning unit 24 performs machine learning using the training data in the training DB 25 to which the correlation rules are added in step 15 in addition to the single rules, and generates the learned model for estimating the failure factor.

The failure estimation device 1 estimates the failure cause of the failure which has occurred during operations using the learned model generated by the preprocessing by the failure estimation support device 2 described above. Here, the learned model (decision tree) is prepared for each SIP server. Specifically, it is as follows.

Step S21: The failure estimation device 1 inputs an operation log stored in an operation information DB (not illustrated) to the learned model as input information when a failure occurs.

Step S22: The failure estimation device 1 estimates the failure cause corresponding to the inputted operation log using the learned model, and outputs an estimation result.

The failure estimation support device 2 of the present embodiment described above includes the single probability calculation unit 21, the correlation probability calculation unit 22, and the correlation rule generation unit 23. The single probability calculation unit 21 calculates the single failure occurrence probabilities of the individual single rules for each single rule relating to a single failure from the past failure occurrence data. The correlation probability calculation unit 22 calculates the multiple failure occurrence probabilities that multiple failures occur in association for each combination of the multiple single rules using the single failure occurrence probabilities. The correlation rule generation unit 23 selects the combination of the multiple failure occurrence probabilities greater than the predetermined threshold among the multiple failure occurrence probabilities as the correlation rule. The correlation rule is used as the training data for making the learned model which estimates the failure factor perform machine learning together with the single rule.

In this way, in the present embodiment, not only the single rules relating to the single failure but also the correlation rules relating to the multiple failures are used for the training data. Thus, in the present embodiment, by making the machine learning of the single rules and the correlation rules based on numerical values (probabilities) at the time of the past failure occurrence as failure indications be performed, the failure cause can be automatically estimated (isolated).

In addition, in the present embodiment, by generating the correlation rules from the single rules as the training data of the learned model and performing machine learning using the single rules and the correlation rules, the highly accurate learned model of good quality can be generated. Thus, the highly accurate failure cause can be automatically estimated, and operation loads required for failure isolation processing on a maintenance person can be reduced.

Note that the present invention is not limited to the embodiment described above, and can be variously modified within the scope of the gist. For example, while the failure estimation device 1 and the failure estimation support device 2 are described as different devices in the above-described embodiment, the failure estimation device 1 and the failure estimation support device 2 may be integrated and the functions may be implemented on one device.

REFERENCE SIGNS LIST

1 Failure estimation device
11 Learned model
2 Failure estimation support device
21 Single probability calculation unit
22 Correlation probability calculation unit
23 Correlation rule generation unit
24 Machine learning unit
25 Training DB
26 Operation history DB
27 Model storage unit

The invention claimed is:

1. A failure estimation support device comprising:
a first calculation unit, including one or more processors, configured to calculate single failure occurrence probabilities of individual single rules for each single rule relating to a single failure from past failure occurrence data;
a second calculation unit, including one or more processors, configured to calculate multiple failure occurrence probabilities that multiple failures occur in association for each combination of multiple single rules using the single failure occurrence probabilities; and
a correlation rule generation unit, including one or more processors, configured to select the combination of the multiple failure occurrence probabilities greater than a predetermined threshold among the multiple failure occurrence probabilities as a correlation rule,
wherein the correlation rule is configured to be used as training data for making a learned model which estimates a failure factor perform machine learning together with the single rule.

2. The failure estimation support device according to claim 1,
wherein the second calculation unit is configured to calculate a probability that failures of the single rules of the combination simultaneously occur, as the multiple failure occurrence probability.

3. The failure estimation support device according to claim 1,
wherein the second calculation unit is configured to calculate a probability that a second single rule of the combination occurs in a case where the failure of a first single rule of the combination occurs, as the multiple failure occurrence probability.

4. A failure estimation support method performed by a failure estimation support device comprising:
calculating single failure occurrence probabilities of individual single rules for each single rule relating to a single failure from past failure occurrence data;
calculating multiple failure occurrence probabilities that multiple failures occur in association for each combination of multiple single rules using the single failure occurrence probabilities; and
selecting the combination of the multiple failure occurrence probabilities greater than a predetermined threshold among the multiple failure occurrence probabilities as a correlation rule,
wherein the correlation rule is configured to be used as training data for making a learned model which estimates a failure factor perform machine learning together with the single rule.

5. The failure estimation support method according to claim 4,
wherein calculating the multiple failure occurrence probabilities comprises: calculating a probability that failures of the single rules of the combination simultaneously occur, as the multiple failure occurrence probability.

6. The failure estimation support method according to claim 4,
wherein calculating the multiple failure occurrence probabilities comprises: calculating a probability that a second single rule of the combination occurs in a case where the failure of a first single rule of the combination occurs, as the multiple failure occurrence probability.

7. A non-transitory computer readable medium storing one or more instructions causing a computer to execute:
calculating single failure occurrence probabilities of individual single rules for each single rule relating to a single failure from past failure occurrence data;
calculating multiple failure occurrence probabilities that multiple failures occur in association for each combination of multiple single rules using the single failure occurrence probabilities; and
selecting the combination of the multiple failure occurrence probabilities greater than a predetermined threshold among the multiple failure occurrence probabilities as a correlation rule,
wherein the correlation rule is configured to be used as training data for making a learned model which estimates a failure factor perform machine learning together with the single rule.

8. The non-transitory computer readable medium according to claim 7,
wherein calculating the multiple failure occurrence probabilities comprises: calculating a probability that failures of the single rules of the combination simultaneously occur, as the multiple failure occurrence probability.

9. The non-transitory computer readable medium according to claim 7,
wherein calculating the multiple failure occurrence probabilities comprises: calculating a probability that a second single rule of the combination occurs in a case where the failure of a first single rule of the combination occurs, as the multiple failure occurrence probability.

* * * * *